United States Patent [19]
Albaugh

[11] 3,931,877
[45] Jan. 13, 1976

[54] MATERIAL DIVERTER STRUCTURE
[75] Inventor: LeMar L. Albaugh, Anamosa, Iowa
[73] Assignee: Anamosa Farm Systems, Inc., Anamosa, Iowa
[22] Filed: Apr. 15, 1974
[21] Appl. No.: 460,728

[52] U.S. Cl. .................. 193/15; 52/195; 52/196; 193/29; 193/34; 214/17 R
[51] Int. Cl.² ................ B65G 11/02; B65G 65/38
[58] Field of Search .......... 193/4, 5, 15, 16, 29, 33, 193/34, 2 R; 214/17 DB, 17 R; 52/195, 196

[56] References Cited
UNITED STATES PATENTS

| | | | |
|---|---|---|---|
| 440,617 | 11/1890 | Bredel | 193/15 X |
| 613,854 | 11/1898 | Coze | 193/15 X |
| 1,678,382 | 7/1928 | Daw | 193/16 |
| 1,789,123 | 1/1931 | Triggs | 193/33 |
| 3,202,254 | 8/1965 | Oughton et al. | 193/15 |
| 3,655,245 | 4/1972 | Schumacher | 214/17 DB X |
| 3,709,345 | 1/1973 | Price | 193/34 |
| 3,777,429 | 12/1973 | Koser | 52/196 |
| 3,797,625 | 3/1974 | Price | 193/34 |

Primary Examiner—Evon C. Blunk
Assistant Examiner—James L. Rowland
Attorney, Agent, or Firm—Burd, Braddock & Bartz

[57] ABSTRACT

A material diverter for a tower silo for carrying material to the base of the silo independent of the silo chute. The diverter has an upright downspout attached to the outside of the chute and a housing located within the chute for receiving material moving through the silo doorway and directing the material into the downspout. The housing is pivotally connected to a carriage operable to move on upright tracks secured to the chute. The housing can be aligned with one of a plurality of structures used to connect the downspout to the chute so that the material at various elevations can be discharged through the housing into the downspout.

14 Claims, 8 Drawing Figures

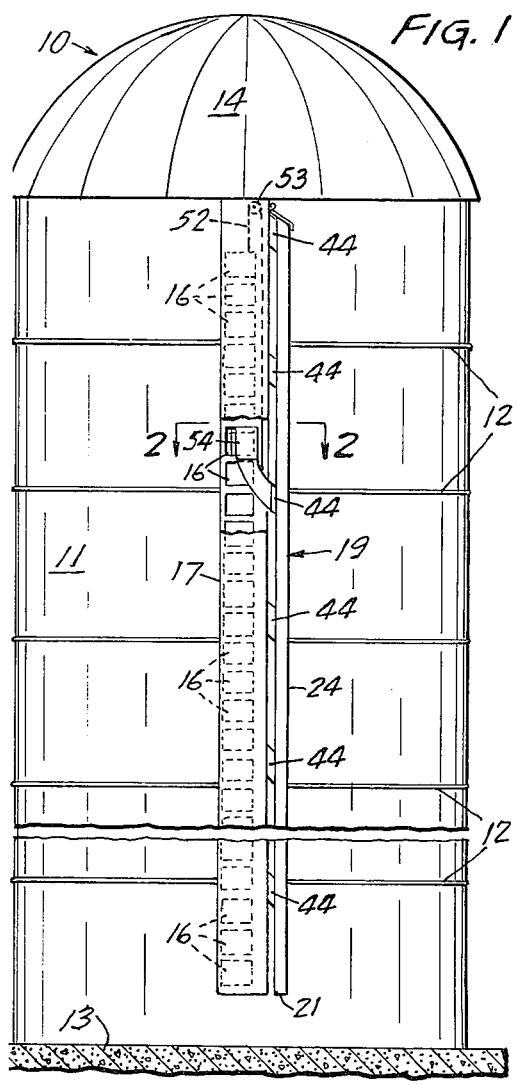
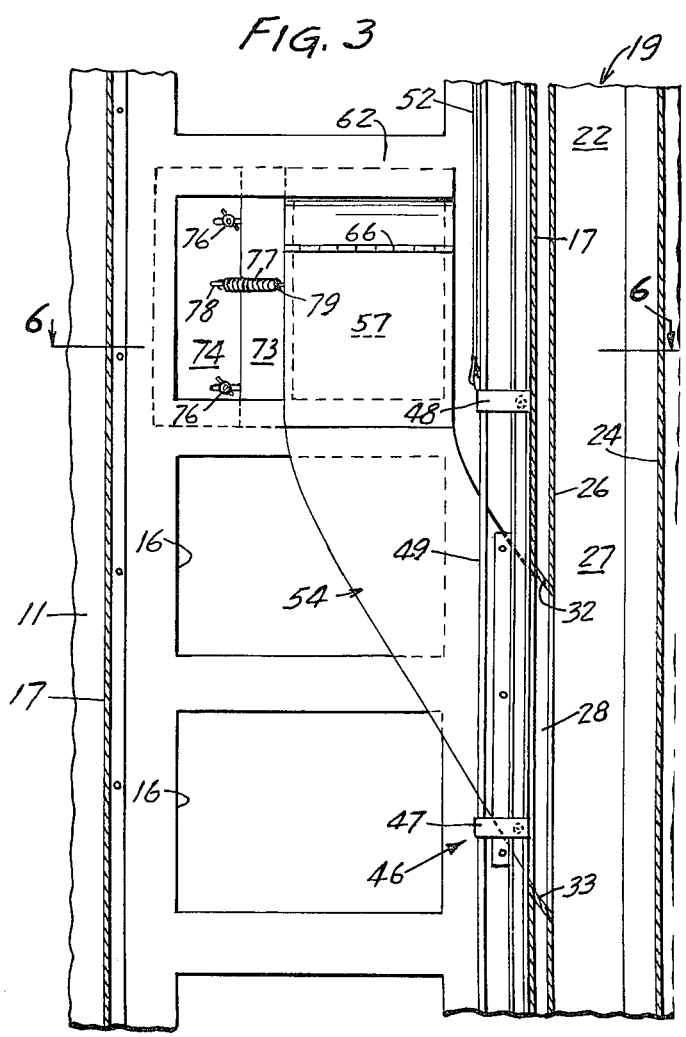
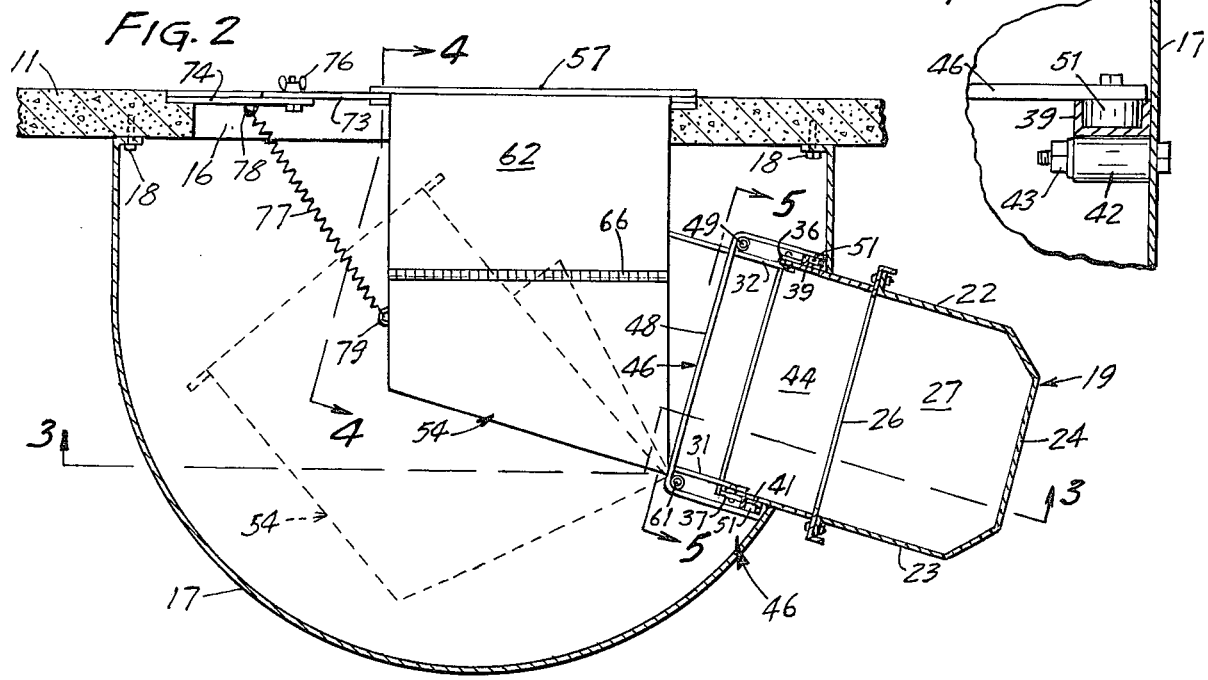

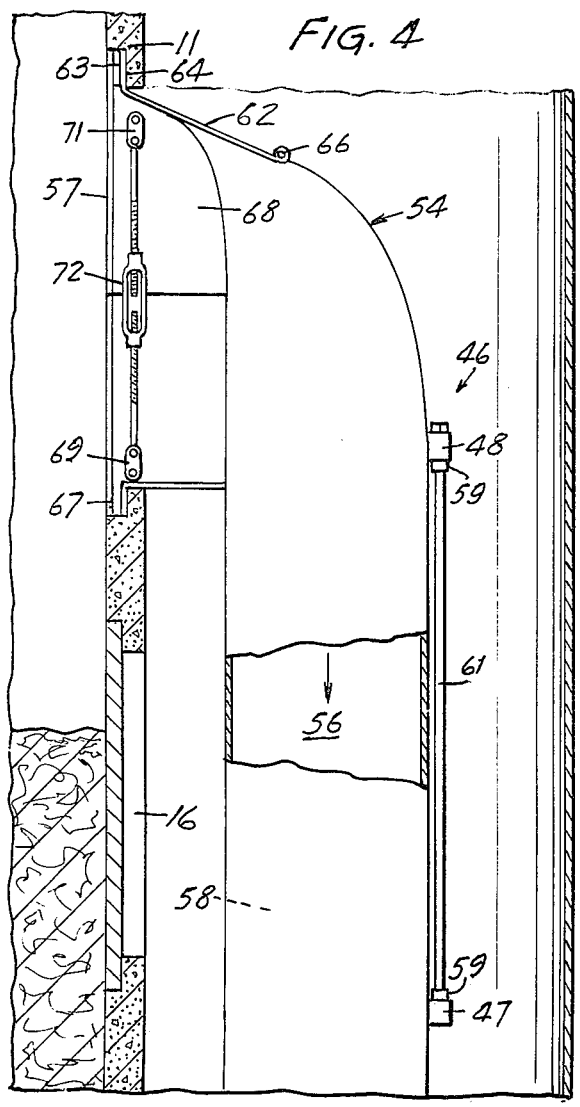
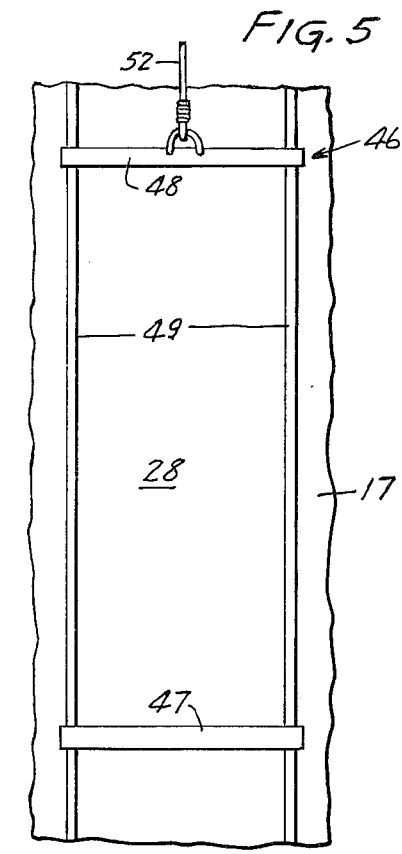
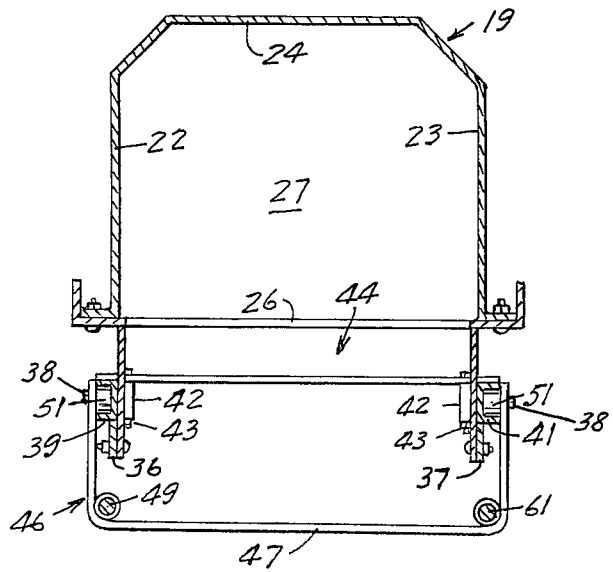
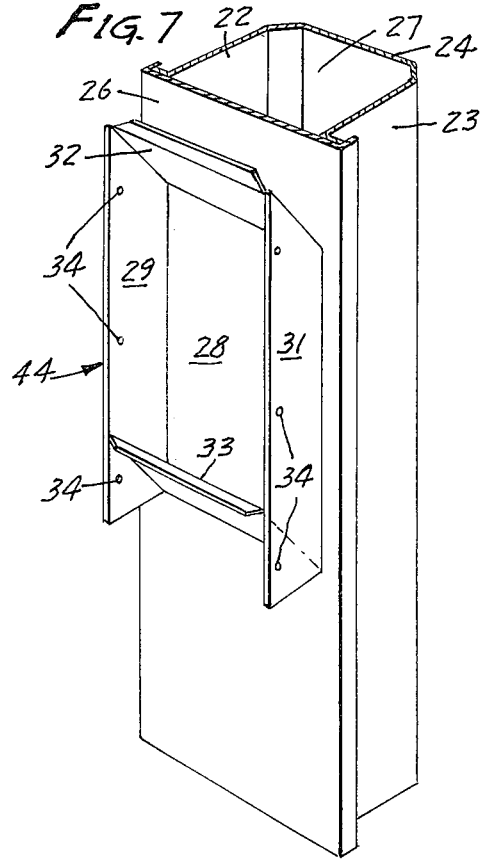

3,931,877

MATERIAL DIVERTER STRUCTURE

BACKGROUND OF INVENTION

Conventional tower silos are constructed with a plurality of vertically spaced doorways providing access passageways into the silos. The doorways are closed with doors to retain the silage in the silo. As the level of silage is lowered, the doors are removed so that the silage can be discharged through the doorway and carried via the chute to the base of the silo. Automatic machines known as silo unloaders are utilized to collect the silage in the silo and discharge the silage via the doorway into the chute. Examples of silo unloaders are disclosed in U.S. Pats. Nos. 2,794,560 and No. 3,017,043. The result of this practice is that the chutes collect silage and the steps and doorways below the open doorway accumulate silage. This collection of silage makes it hazardous to climb into the silo. Elongated tubular plastic material has been used to carry the silage down the chute to the base of the silo. The material flows through the tubular material. One form of this structure is shown in U.S. Pat. No. 3,709,345. The tubular plastic material becomes rigid in cold weather and uses space in the chute, thereby making it difficult to climb into the silo.

SUMMARY OF INVENTION

The invention is directed to material diverter means used with means having a passageway for carrying material to a location. More particularly, the invention is directed to an upright tubular member having a passageway connected to a silo chute or enclosure means for doorways in a structure, as a silo. Material diverter means is located within the chute for receiving material from the inside of the silo and directing the material into the upright tubular member. A plurality of vertically spaced connecting housings are used to secure the upright tubular member to the chute. Each housing has an opening open to the inside of the chute and inside of the tubular member so that the material flowing through the material diverter means flows into the upright tubular member. The material diverter means is a housing mounted on a carriage. The carriage rides on an upright track whereby the carriage and housing can be elevated in the silo chute in accordance with the level of silage in the silo or lowered to the base of the silo.

An object of the invention is to provide material diverter structure which receives material discharged through the doorway of a structure and carries the material to a location. Another object of the invention is to provide material diverter structure for a tower silo which diverts the material from the passageway of the chute of the silo into a downspout, thereby keeping the passageway of the chute clean and safer to use. A further object of the invention is to provide a material diverter which can be moved up and down the chute of the silo as required to receive material discharged from the silo. A still further object of the invention is to provide a material diverter housing which is usable with different size silo doorways and different configurations of silo chutes.

IN THE DRAWINGS

FIG. 1 is a foreshortened front elevational view of a tower silo equipped with the material diverter structure of the invention;

FIG. 2 is an enlarged sectional view taken along the line 2—2 of FIG. 1;

FIG. 3 is an enlarged front elevational view, partly sectioned, of the material diverter structure of FIG. 1;

FIG. 4 is a sectional view taken along the line 4—4 of FIG. 2;

FIG. 5 is a sectional view taken along the line 5—5 of FIG. 2;

FIG. 6 is a sectional view taken along the line 6—6 of FIG. 3;

FIG. 7 is a perspective view of the section of the downspout showing its inlet housing; and FIG. 8 is an enlarged sectional view showing the mount connecting the track to the silo chute.

DESCRIPTION OF PREFERRED EMBODIMENT:

Referring to FIG. 1, there is shown a tower silo indicated generally at 10 having a cylindrical side wall 11. Conventional circular hoops 12 surround the side wall 11. The silo 10 extends upwardly from a base or support 13 and is covered with a dome roof 14. The side wall 11 has a plurality of vertically spaced doorways 16 providing access to the interior of the silo. An upwardly directed enclosure or chute 17 extends about the doorways 16 providing an upright passageway used to climb the silo. Chute 17 has a generally U-shaped construction, as shown in FIG. 2. A plurality of fasteners 18, as bolts and the like, are used to attach the ends of the chute 17 to the side wall 11 and hoops 12. In conventional silos, the passageway provided by the chute 17 is used to carry the material, as silage, haylage and the like, down to the base of the silo. The operator also uses the passageway to climb up into the silo to service and adjust the silo unloader, such as shown by Buschbom in U.S. Pat. No. 2,794,560. When the silage flows down the passageway it accumulates on the steps and creates a hazard for climbing into the silo. Also, it takes an increased amount of time to safely climb into the silo.

As shown in FIGS. 1, 2 and 3, a second chute or downspout, indicated generally at 19, extends upwardly adjacent the chute 17. Spout 19 is a tubular structure having an open lower end 21 located above the support 13 so that the material from the silo will flow down the spout and be delivered to the support 13 adjacent the end 21. The spout 19 has spaced side walls 22 and 23 connected with an outside wall 24. An inside wall 26 is spaced from the outside wall 24 whereby the walls 22, 23, 24 and 26 form the tubular structure with a generally upright passageway 27.

Referring to FIG. 7, the downspout 19 has an inlet housing or connector indicated generally at 44 providing an opening 28 into the passageway 27. The housing 44 has generally upright side flanges 29 and 31, an upwardly and outwardly inclined top flange 32 and an upwardly and outwardly inclined bottom flange 33. Side flanges 29 and 31 have a plurality of vertically spaced holes 34 used to attach the downspout 19 to support members 36 and 37 in chute 17. The spout 19 has a plurality of inlet housings 44 which function as connectors to secure the spout 19 to the side of the chute 17. The housings 44 also have passages to provide for communication between the passageway of the chute 17 and the passageway 27 of the spout 19. For example, the housings can be placed at 5 foot elevations along the vertical extent of chute 17. Other spacings can be used for the inlet housings 44.

As shown in FIG. 2, a pair of generally upright supports 36 and 37 extend inwardly from upright rails or tracks 39 and 41. A plurality of fasteners 38, as bolts, extend through holes 34 and secure the side walls 29 and 31 to the supports 36 and 37. The side walls 29 and 31 extend through an opening in the chute 17.

Referring to FIGS 6 and 8, the rails 39 and 41 are generally U-shaped members having one side located in engagement with the inside wall of the chute 17. Sleeve members 42 are secured to the backs of rails 39 and 41. Bolts 43 or other fasteners extend through sleeves 42 and suitable holes in the chute 17 and thereby fasten the rails 39 and 41 to chute 17.

Returning to FIGS 2, 3 and 6, a carriage indicated generally at 46 moves up and down the rails 39 and 41. Carriage 46 has a generally U-shaped bottom member 47 and a U-shaped top member 48. A pair of upright rods 49 extend between and are secured to opposite sides of the U-shaped members 47 and 48 to form a generally rectangular angular frame for carriage 46. Rollers 51 rotatably mounted on the ends of the U-shaped members 47 and 48 are located in the channels of tracks 39 and 41, as shown in FIG. 6, so that the carriage is rotatably mounted on tracks 39 and 41. A cable 52 is connected to the midsection of the upper U-shaped member 48. The cable 52 extends upwardly in the passageway of chute 17 and is trained about a pulley 53, shown in FIG. 1, and extends down to the bottom of the silo. The cable 52 is used to change the position of the carriage in the chute 17. The pulley 53 is mounted on a bracket (not shown) secured to the upper portion of the silo wall 11.

The material diverter or housing 54 having a passageway 56 is carried by the carriage 46. The housing 54 has an open inlet 57 facing a doorway 16 of the silo so as to receive the silage from the silo unloader. The lower portion of housing 54 has an outlet aligned with opening 28 so that the silage is directed into the passageway 27 of the downspout 19. As shown in FIG. 4, an elongated upright tube 59 is secured to one side of housing 54. A rod 61 extends through the tube 59 and is rotatably mounted on sleeves (not shown) secured to the U-shaped members 48 and 49. The tube 59 permits housing 54 to pivot away from the silo wall, as shown in broken lines in FIG. 2, so that the carriage 46 and housing 54 can be moved in the chute passageway.

Referring to FIG. 4, the housing 54 has a top member 62 having an upwardly directed transverse flange 63. Flange 63 is located in the door recess 64 to hold the housing 54 in alignment with the door opening. The top member 62 is pivotally connected with a hinge 66 to the housing 54 to permit the member 62 to be raised and lowered. The lower part of the inlet section of the housing 54 has a transverse lower flange 67 located in the bottom door recess. The inlet portion of the housing 54 has a side wall section 68 which permits elongation of the forward section to locate flanges 63 and 67 in the door recesses. A link 69 is pivotally connected to the housing adjacent flange 67. In a similar manner, a link 71 is pivotally mounted to housing 54 adjacent flange 63. A turnbuckle 72 extends between and is pivotally connected to the outer or adjacent ends of links 69 and 71. Turnbuckle 72 is adjustable to force flanges 63 and 67 into the silo door grooves in silo wall 11. The opposite side of housing 54 can have a similar turnbuckle to control the size of the inlet section of housing 54. Other types of expanding mechanisms can be used to hold the housing 54 in the doorway.

Referring to FIGS 2 and 3, the inlet section of housing 54 has a width smaller than the width of silo door opening 16. The section of the door between the inlet section of housing 54 and the silo wall 11 is closed with a pair of panels 73 and 74. The panels 73 and 74 are adjustable connected with a plurality of nut and bolt assemblies 76, or similar fasteners. This permits adjustment of the width of the panels to accommodate different size doors. A spring 77 biases the housing 54 toward the silo wall 11. One end of the spring 77 is connected to a loop 78 connected to panel 74. The opposite end of the spring 77 is connected to a loop 79 connected to the side of housing 54.

In use, the silo unloader operating within the silo discharges a steady stream of material into the housing inlet 57. The material flows with the air through the passageway in the housing 54. The material moves in a downward and outward direction into the opening 28 of the connecting housing 44 shown in FIG. 3. The cable 52 is secured to hold the carriage 46 in a fixed position relative to the tracks 39 and 41. The forward or inlet portion of the housing 54 is retained on the silo wall 11. The panels 73 and 74 close the opening so that the material discharaged by the silo unloader must flow through the housing 54. The spout 19 has an upright passageway 27 open to the opening 28. The material flows through opening 28 into the passageway 27. The material moves downwardly and is discharged from the bottom end 21 onto the location adjacent the support 13 for the silo. The material can be discharged directly into a conveyor or bunk feeder operable to distribute the material to a feed lot.

As the level of the material in the silo lowers, the housing 54 and carriage 46 are moved downwardly in chute 17 until the discharge end of housing 54 is aligned with the next lower connector housing 44. The panels 73 and 74 are released from the side wall 11. The linkage structure and turnbuckle 72 are loosened whereby the top member 62 moves from the groove of the side wall 11. The housing 54 can then be raised from the doorway and swung to the open or outward position, as shown in broken lines in FIG. 2. The entire housing is now supported by the carriage 46. The cable 52 is used to allow the carriage to move down in the silo chute. When the housing 54 is moved to the lower doorway, the door closing the doorway is removed. The housing is swung into the open doorway. The panels 73 and 74 are replaced and adjusted with nut and bolt assemblies 76. The spring 77 is replaced. The housing 54 is ready to receive material from the silo unloader. The downspout 19 is not adjusted or positioned as it can receive silage from housing 54 in all elevataions of housing 54.

While there has been shown and described a preferred embodiment of the inventions, it is understood that various changes in the structures and shapes of the structures can be made by those skilled in the art without departing from the invention. For example, the housing and downspout can be made of metal, plastic or other structural materials.

The embodiments of the invention in which an exclusive property or privilege is claimed are defined as follows:

1. A material carrying means for a structure having a plurality of vertically spaced doorways and enclosure means covering the doorways with the enclosure means providing a passageway to the doorways comprising: means having a passage for carrying material to a location, material diverter means located within said enclosure means for receiving material and directing the material from said structure through one of said doorways to said passage of the means for carrying material to a location whereby the material moves through the one of said doorways, the diverter means and the means having a passage to the location, upright track means located in the passageway and mounted on the enclosure means, carriage means cooperating with the track means to guide the carriage means along the track means, and means mounting the material diverter means on the carriage means whereby the material diverter means moves with the carriage means to a position aligned with a selected doorway, said means mounting the material diverter means including upright pivot means mounting the material diverter means on the carriage means to allow pivotal movement of the material diverter means away from the selected doorway into the passageway whereby the material diverter means is free to be moved along the passageway.

2. The structure of claim 1 wherein: the means having a passage for carrying material to a location includes an upright tubular member having said passage, and housing means connected to the upright tubular member, said housing means having an opening in communication with said passage, said material diverter means located to deliver material to said opening whereby the material flows through the opening into the passage.

3. The structure of claim 2 wherein: said track means mounted on the enclosure means has a first upright track located adjacent one side of the selected opening and a second track located adjacent the other side of the selected opening, said carriage means being movably mounted on said first and second track to align the material diverter means with selected the opening.

4. The structure of claim 3 wherein: said material diverter means includes a passageway with an inlet open to the selected doorway and an outlet aligned with the opening in the housing means.

5. The structure of claim 1 wherein: the material diverter means includes a housing having a passageway and an inlet open to the selected doorway and an outlet in communication with the passage in the means for carrying material to a location.

6. The structure of claim 5 wherein: said housing means is smaller than said selected doorway and means for closing the selected doorway when said housing is located in said selected doorway.

7. The structure of claim 1 including: biasing means to hold the material diverter means adjacent the structure whereby the material moving through the selected doorway will flow into the material diverter means.

8. The structure of claim 1 wherein: the material diverter means includes a housing having an inlet section, said inlet section having a movable portion operable to engage the structure, and means for moving the movable portion into operable engagement with said structure.

9. The structure of claim 8 wherein: the means for moving the movable portion includes an expandable member.

10. The material carrying means of claim 1 including: means mounting the carriage means on the track means whereby the carriage means can be moved along the track means.

11. The material carrying means of claim 10 wherein: said track means includes a first track located adjacent one side of the selected doorway and a second track located adjacent the other side of the selected doorway.

12. The material carrying means of claim 10 wherein: said material diverting means has a passageway, an inlet open to the passageway and an outlet for directing material moving through the passageway to the location.

13. The material of claim 10 including: biasing means connected to the material diverting means to bias the material diverting means into a material receiving position.

14. The material carrying means of claim 10 wherein: the carriage means has a side portion located adjacent a side portion of the material diverting means, said pivot means including an upright pivot connecting the side portions of the carriage means and material diverting means whereby the material diverting means pivots relative to the side portion of the carriage means.

* * * * *